United States Patent [19]
Tamura et al.

[11] 4,425,031
[45] Jan. 10, 1984

[54] AUTOMATIC FOCUS ADJUSTING APPARATUS FOR CAMERA

[75] Inventors: Shuichi Tamura, Yokohama; Masahiko Ogawa, Hino; Tokuichi Tsunekawa, Yokohama; Ryuji Tokuda, Tokyo, all of Japan

[73] Assignee: Canon Kabushiki Kaisha, Tokyo, Japan

[21] Appl. No.: 265,806

[22] Filed: May 21, 1981

Related U.S. Application Data

[63] Continuation of Ser. No. 032,791, Apr. 17, 1979, abandoned.

[30] Foreign Application Priority Data

Apr. 23, 1978 [JP] Japan .................. 53-48006

[51] Int. Cl.$^3$ .................. G03B 3/00; G01J 1/46
[52] U.S. Cl. .................. 354/403; 250/214 B
[58] Field of Search .................. 354/25 R, 25 A, 25 P, 354/25 N, 31, 31 F, 162, 163, 165, 195; 352/140; 355/56; 356/1, 4; 307/311, 353; 328/151; 358/105; 369/45, 46; 354/195; 250/214 AL, 214 B, 214 C

[56] References Cited

U.S. PATENT DOCUMENTS

| | | | |
|---|---|---|---|
| 3,602,826 | 8/1971 | List ....................... | 307/353 X |
| 3,678,835 | 7/1972 | Takishima .................. | 354/25 R |
| 3,988,747 | 10/1976 | Lermann et al. ............ | 354/25 |
| 3,999,192 | 12/1976 | Hosoe et al. ............... | 354/25 A |
| 4,032,934 | 6/1977 | Hendrickson ............... | 354/25 |

Primary Examiner—William B. Perkey
Attorney, Agent, or Firm—Toren, McGeady and Stanger

[57] ABSTRACT

The active automatic focusing apparatus disclosed scans the object to be photographed with light from a light projector and includes a sensor sensing reflected light, a peak detector for detecting the peak value of the signal sensed by the sensor, a control producing a stop signal suitable for stopping focusing movement of the objective lens in accordance with the output of the peak detector, and a stop device for stopping the movement of the objective lens on the basis of the output of the control. A comparator compares the level of the detected signal with that of a preset noise signal so as to produce a first control signal when the level of the detected signal is higher than that of the noise signal. A given distance detector produces a second control signal when the objective lens is moved to a predetermined position corresponding to a distance at which a peak of the detected signal can be detected by the peak detector. An arrangement applies a second stop signal to the stop device to stop the movement of the objective lens when the first and the second stop signals are produced.

31 Claims, 19 Drawing Figures

AUTOMATIC FOCUS ADJUSTING APPARATUS FOR CAMERA

This is a continuation of application Ser. No. 032,791 filed April 17, 1979, now abandoned.

BACKGROUND OF THE INVENTION

1. Field of the Invention

The present invention relates to an automatic focus adjusting apparatus particularly for a camera.

2. Description of the Prior Art

Until now, proposals have been made for various kinds of automatic focus adjusting apparatus. Light projected by a light projector and reflected from the object is detected by a light sensor to adjust the focus. Such apparatus are accurate when the object is close. However, when the object is far away, the energy of the light projected by the light projector and reflected on the object is too small for the peak value to be detected accurately enough for an accurate focus adjustment.

To some extent, this difficulty can be overcome to some extent by using a large light projector or a large power source to increase the output of the light projector by using a large condenser lens to increase the sensing accuracy of the apparatus. However, this makes the apparatus quite large so that its lack of portability makes it inconvenient.

In a conventional apparatus, when the object is within a predetermined range, accurate focusing is possible while, on the other hand, when the object is beyond that range, accurate focusing is not possible due to the weak reflected light.

A purpose of the present invention is to offer a simple automatic focus adjusting apparatus by means of which an accurate focus adjustment can be obtained from the close distance to a distance beyond the predetermined range such as a range embracing the hyperfocal distance.

Another purpose of the present invention is to offer a simple automatic focus adjusting apparatus by means of which an accurate focus adjustment can be obtained from close up to ∞.

SUMMARY OF THE INVENTION

When the object is within the predetermined range, the peak value is detected in the conventional way, while when the object is in the ranges beyond the predetermined range, the reflected light is detected when the photographic lens assumes a certain determined position corresponding to a position beyond the predetermined position in such a manner that the movement of the lens is stopped when the reflected light is sensed as present.

DESCRIPTION OF PREFERRED EMBODIMENTS

Figure 1:
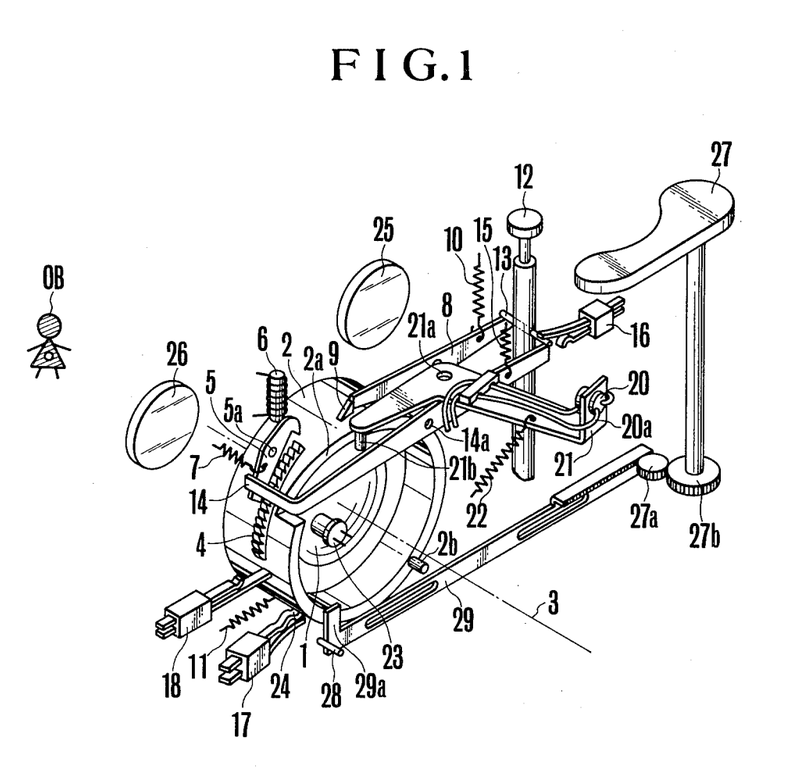
FIG. 1 shows the important part of the camera in accordance with the present invention.

FIG. 1 shows a perspective view of an important part of an embodiment of the camera in which the focus adjusting device in accordance with the present invention is applied. In the drawing, a photographing or objective lens 1, mounted in a lens barrel 2 is moved along the optical axis 3 by rotation of the lens barrel 2. A cam 2a is provided at the rear end of the lens barrel, and a pin 2b is provided on the lens barrel 2 at a position corresponding to the hyperfocal distance. Ratchet teeth 4 extend along the circumference of the lens barrel 2 to engage a stop claw 5 held on the shaft 5a and urged by a spring 7 into engagement with the ratchet teeth 4. A magnet 6 attracts and holds the end of the stop claw 5 against the spring 7 when current is supplied. A holding lever 8 is normally urged by a spring 10 into engagement with a projection 9 on the circumference of the lens barrel in order to prevent the rotation of the lens barrel 2 by the spring 11. A shutter button 12 carries a pin 13. A set lever 14 is rotatable around a shaft 14a, and is urged in one direction by a spring 15. A main switch 16 is closed by the initial stroke of the shutter button 12. A light source switch 17 is opened at the start of rotation of the lens, and a switch 18 detects the fact that a predetermined distance is reached.

20 is the modulatable light source such as LED, semiconductor LASER and so on, being secured on the holder 21 rotatable around the shaft 21a, whereby the conductor 20a is laid on the holder, fixed by means of a fixing member near the shaft 21a and lead to the lighting circuit at the lower part. In this way, the movement of the conductor 20a during the rotation of the holder 21 is made as small as possible.

22 is the spring for urging the pin 21 at the end of the holder 21 so as to be engaged with the cam 2a of the lens barrel. 23 is the photo-electric transducing element such as silicone photocell (hereinafter called SPC). 25 the projecting lens, whereby the light source 20 is provided nearly at the focal position. 26 is the light receiving lens, at whose focal position the light sensing element 23 is provided. 27 is the film winding up lever, 28 the stopper to be brought in contact with the rising up part 29a of the charge lever 29 at the termination of the film winding up and 29 the charge lever to be moved to the right through the gears 27a and 27b along with the counterclockwise rotation of the winding up lever 27.

Figure 2:
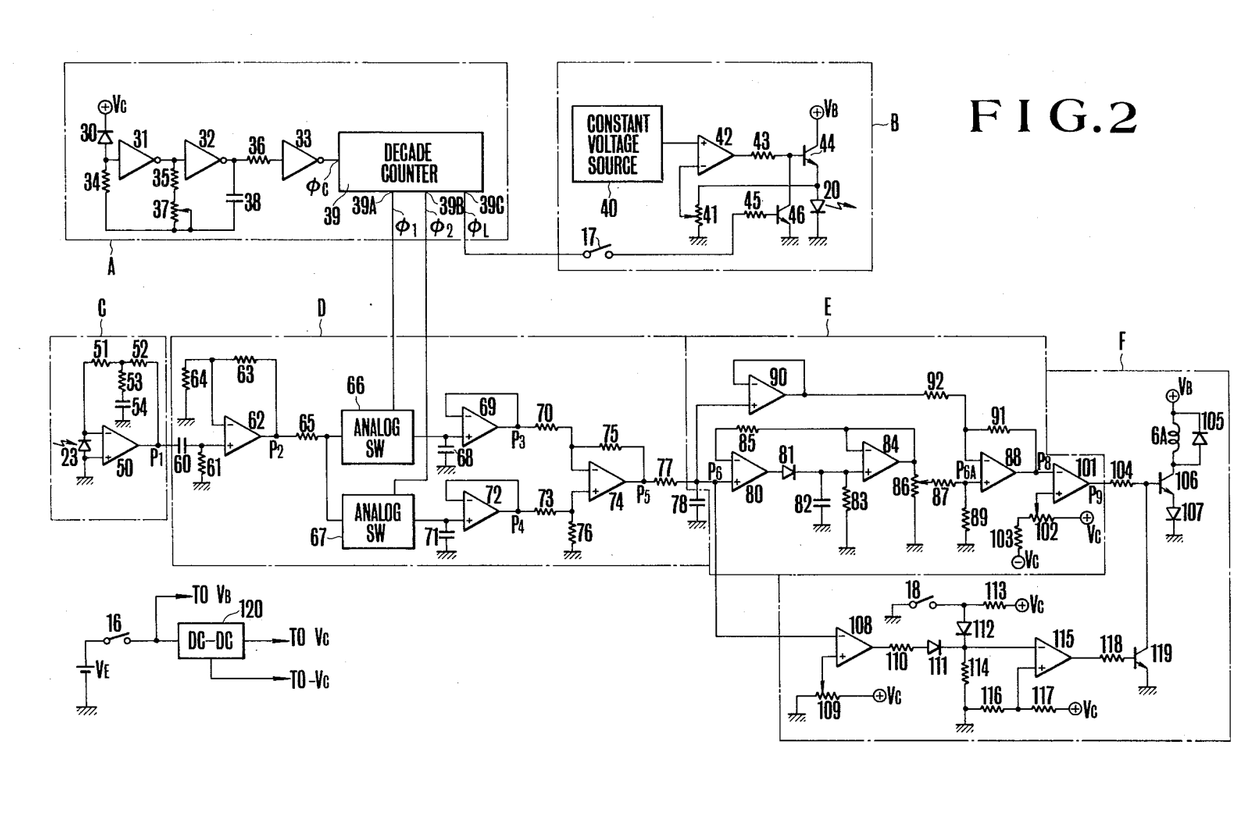
FIG. 2 shows the electrical circuit of the camera shown in FIG. 1.
Figure 3A:
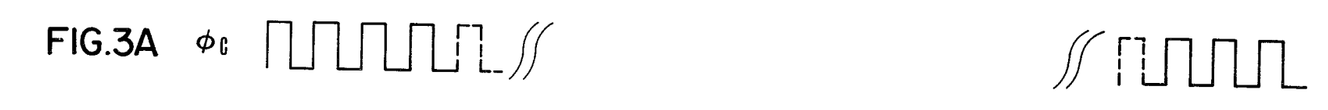
FIGS. 3A-3D show the waveforms of the outputs of the counter shown in FIG. 2.
Figure 3B:
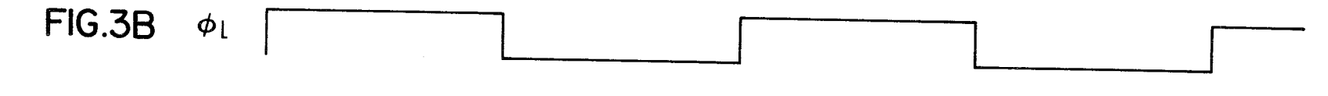
Figure 3C:
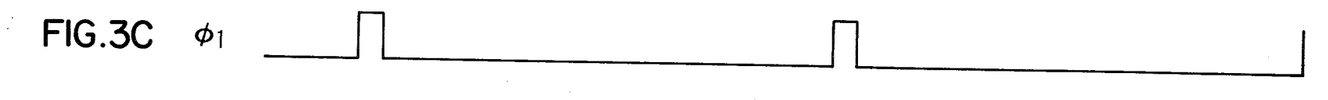
Figure 3D:
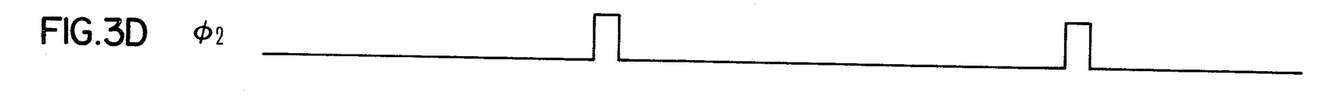

The electrical circuit for the device in FIG. 1 appears in FIG. 2. Here, the part in the dot dash line A is the pulse generator and includes a breakage prevention diode 30 connected to the positive line Vc, inverters 31, 32, 33, resistors 34, 35, 36, 37, a capacitor 38 and a decade counter 39 having a clock input terminal connected to the output terminal of the inverter 33. The inverters 31, 32, the resistors 34, 35, 37 and capacitor 38 form an oscillator whose variable resistor 37 serves to alter the oscillation frequency. The decade counter 39 is a conventional one having 10 decoded decimal outputs. It is provided with a first output terminal 39A for producing a first output signal as shown with $\phi_1$ in FIG. 3 in case a clock signal as is shown with $\phi_C$ in FIG. 3 is applied to the clock input terminal, a second output terminal 39B for producing a second output signal as is shown with $\phi_2$ in FIG. 3 and a carry out terminal 39C for producing a carry out signal as is shown with φL in FIG. 3.

The part in the dot dash line B is a light emitting projection light source. It includes an operational amplifier 42 having a non-inverting input terminal connected to the output of the constant voltage source 40 and an inverting input terminal connected to the grounded variable resistance 41. An npn transistor 44 in the source B has a base electrode connected to the output terminal of the amplifier 42 through a resistor 43. An infrared light emitting diode 20 is driven by a transistor 44 and an npn transistor 46. The latter has a base electrode connected to the carry out terminal 39C through a resistor 45 and the switch 17 shown in FIG. 1. Further, the emitter electrode of the transistor 46 is connected to the base electrode of the transistor 44 in order to control the light emitting timing of the light emitting diode 20 (hereinafter called LED). The LED as well as the switch 17 are arranged at the positions as shown in FIG. 1.

A light sensing part or sensor C serves for transducing the amount of infrared light emitted from the LED and reflected by the object, not shown in the drawing, into an electrical signal. It is composed of the SPC 23 of FIG. 1 for detecting infrared light, and an operational amplifier 50 having an inverting input terminal connected to the cathode electrode and a non-inverting input terminal connected to the anode electrode of the SPC 23. Transducer C also includes two resistors 51 and 52 connected between the input and the output terminal of the amplifier 50 and a resistor 53 and a capacitor 54 for amplifying only the output signal synchronized with the light emitting frequency of the LED 20, that is, the output signal of the high frequency range out of the output signal of the SPC.

A signal processing or processor D is composed of elements 60 to 78 including a capacitor 60 connected to the output terminal of the light sensor C, and a resistor 61 for forming a high pass filter (hereinafter called HPF) with the capacitor 60.

The HPF has a cut-off frequency of about 1[KHz] which is chosen for example in case the light emitting frequency of the LED 20 is 10[KHz]. An operational amplifier 62 has two resistors 63 and 64 connected thereto and a resistor 65 connected to the output terminal thereof. The control signal terminal of a conventional switch 66 is connected to the first output terminal 39A of the counter 39, while the control signal terminal of a conventional switch 67 is connected to the second output terminal 39B of the counter 39. Capacitors 68 and 71 serve for storing analog signals. Two operational amplifiers 69 and 72 form buffer circuits and an operational amplifier 74 subtracts the analog signals produced by the two buffer circuits. The non-inverting input terminal of the amplifier 74 is connected to the output terminal of the amplifier 72 through the resistor 73 and grounded through the resistor 76. On the other hand, the inverting input terminal is connected to the output terminal of the amplifier 69 through the resistor 70. A resistor 75 is connected between the input and the output terminal of the amplifier, while a capacitor 78 is connected to the output terminal of the amplifier 74 through the resistor 77. The resistor 77 and the capacitor 78 form a low pass filter (hereinafter called LPF) for eliminating the noise component existing in the output signal of the amplifier 74.

A peak detecting part or peak detector is composed of elements 80 to 91 including an operational amplifier having a non-inverting input terminal connected to the output terminal of the LPF, a capacitor 82 connected to the output terminal of the amplifier 80 through the diode 81 so as to hold the peak voltage, a resistor 83, and an operational amplifier 84 having a non-inverting input terminal connected to the output terminal of the capacitor 82 and an inverting input terminal connected to the inverting input terminal of the amplifier 80 through the resistor 85. Element 86 is a potentiometer connected to the output terminal of the amplifier 84, 88 a differential amplifier having a non-inverting input terminal connected to the slide element of the potentiometer 86 through the resistor 87 and an inverting input terminal connected to the output terminal of the capacitor 78 through the resistor 92 and the buffer circuit 90, and 89 and 91 resistors. A comparator 101 has an inverting input terminal connected to the output terminal of the differential amplifier 88. A resistor 102 forms a bias source together with a resistor 103, with one terminal of the bias source connected to the positive line Vc and the other terminal connected to the negative line -Vc through the resistor 103. The level of the bias source is set at a value corresponding to that of the noise signal.

Figure 5:
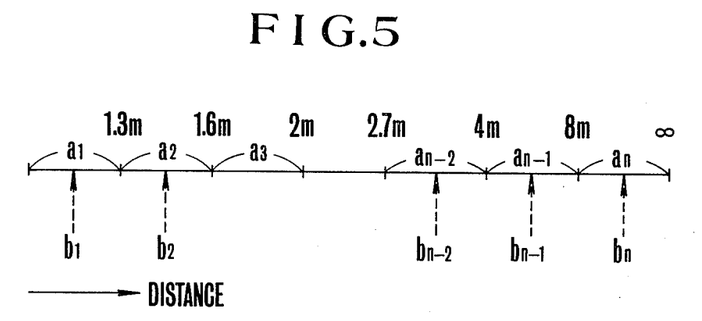
FIG. 5 is the drawing for explaining the adjustable range of the conventional device.

A circuit F includes a driving part or driver for controlling the energization of the magnet 6 and a circuit for compulsorily demagnetizing the magnet when the photographing lens has been advanced to a predetermined position, namely the position corresponding to the distance of bn−1 in FIG. 5. In the circuit F, 104 is a resistor connected to the base electrode of an npn transistor 106, 6A the coil of the magnet 6 shown in FIG. 1, 105 a noise killer or suppressor connected parallel to the coil 6A, and 107 a diode. A comparator 108 forms an inverting input terminal connected to the output terminal of the capacitor 78, and a non-inverting input terminal connected to the bias source for eliminating the noise. A potentiometer 109 forms a bias source in the one terminal connected to the positive line Vc. The bias level of the bias source is set in consideration of the noise level. A diode 111 is connected to the output terminal of the comparator 108 through a resistor 110, and diode 112 is grounded through the switch 18 shown in FIG. 1. A resistor 113 is connected to the positive line Vc. Member 115 is a comparator having an inverting input terminal connected to the cathode of the diodes 111 and 112, members 114, 116–118 resistors, and 119 an npn transistor having an emitter electrode connected to the base electrode of the transistor 106. The elements 108 to 119 constitute a circuit for forcibly demagnetizing the magnet 6, while the elements 110 to 117 constitute an "AND" gate. An DC-CD converter 120 includes an input terminal connected to the power line VB and two output terminals forming the positive line VC and the negative line −Vc.

The operation of the camera is explained below with reference to FIGS. 1 to 6. It is assumed that the object is at the distance at which the peak can be detected, namely, at the position corresponding to bn−2 shown in FIG. 5.

When the winding up lever 27 is rotated clockwise to wind a film (not shown in the drawing), the charge lever 29 is moved to the right by the gears 27a and 27b, so that the pin 2b on the lens barrel 2 is rotated couterclockwise by the rising portion 29a of the charge lever 29 until the projection 9 engages the end of the holding lever 8. The spring 11 urges the lens barrel 2 clockwise to keep the lens barrel 2 in the engaged position.

When the film winding operation has been completed and the winding up lever 27 has been brought back to the initial position shown in FIG. 1, the charge lever 29 is also brought back by means of the gears 27a and 27b to the initial position in which the charge lever 29 is in contact with the stopper 28.

When then the lens 1 is directed toward the object OB, and the shutter button 12 is pushed down, the focus is properly adjusted as follows.

Pushing down the shutter button 12 lowers the pin 13 to close the main switch 16 and connect the power line VB, the positive line Vc and the negative line —Vc in FIG. 2. Thus, a current is supplied to each circuit as well as the coil 6A of the magnet 6.

At this time, the pin 13 moves the set lever 14 clockwise against the force of the spring 15 so that the stop claw 5 tries to follow the rotation of the set lever 14 as a result of the urging of the spring 7. However, the stop claw 5, which is attracted by the magnet 6, maintains the position shown in FIG. 1, despite the rotation of the set lever 14.

At the same time, pushing down the pin 13 causes the holding lever 8 to be disengaged from the projection 9 provided on the lens barrel 2. The latter starts to rotate in response to the force of the spring 11 and moves from a position corresponding to a close up distance into one corresponding to the ∞ distance. Along with the start of the rotation of the lens barrel 2 the switch 17, which has been opened, is closed by means of the upward motion of the pin 24 in such a manner that a carry out signal as is shown by $\phi L$ in FIGS. 3A to 3D or FIGS. 4A to 4K is delivered to the base of the transistor 46 from the carry out terminal 39c. Thus, the transistor 46 shifts between the conductive and the non-conductive state in accordance with the input signal $\phi L$. The LED 20 also intermittently produces the infrared light in response to the input signal $\phi L$. Hereby, in the present embodiment, the clock signal $\phi C$ to be delivered to the clock input terminal of the counter 39 is of 100[KHz], while the output signals $\phi 1$, and $\phi 2$, and $\phi L$ are 10[KHz].

Figure 4A:
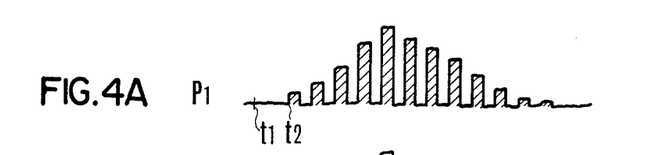
FIGS. 4A-4K show the waveforms of the output of the circuit shown in FIG. 2.
Figure 4B:
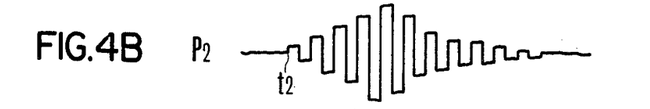
Figures 4C, 4D, 4E:
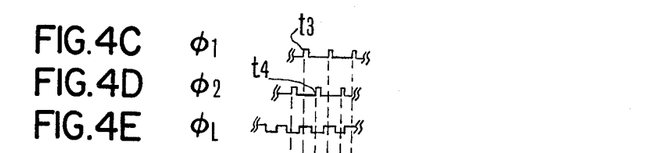
Figure 4F:
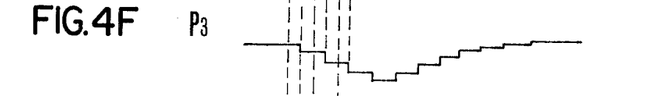

The start of rotation of the lens barrel 2 produces clockwise rotation of the holder 21 engaging the lens barrel 2. Hence, the beam of infrared light emitted from the LED 20 travels from the right to the left so as to scan the object. Because the infrared light beam travels in this way, no infrared light from the LED is incident upon the light sensing element 23 at the time point t1 (FIGS. 3A to 4K) at which no infrared light is reflected by the ojbect OB. Hence, a voltage corresponding to the light such as daylight, fluorescent light or tungsten light is produced at the output terminal of the amplifier 50 as is shown by P1 in FIG. 4A. When a part of the scanning light beam reaches the object OB at the time t2 during the scanning movement, light reflected by the object OB and having passed the light receiving lens 26 strikes the light sensing element 23, so that a voltage corresponding to the incident light, as is shown by P1 in FIG. 4A is produced at the output terminal of the amplifier 50.

Figure 4G:
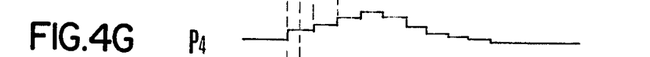
Figure 4H:
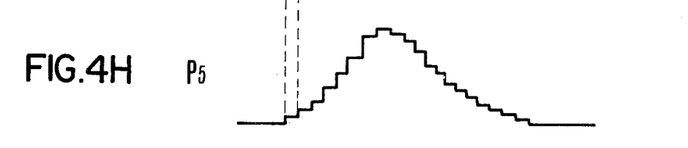

When much more light reaches the object during the scanning movement, a pulse shaped voltage proportional to the increase of the light beam is produced at the output terminal of the amplifier 50. That is, when the light beam crosses the object OB, the output terminal of the amplifier 50 is in the form of a series of voltage pulses having a sawtooth shaped envelope as shown by P1 in FIG. 4. The signals from the amplifier 50, due to daylight, fluorescent light or tungsten light (all not shown) are eliminated by HPF 60 and 61. The remaining signals are amplified by the amplifier 62 and applied to the analog switches 66 and 67.

the analog switches 66, 67 and capacitors 68 and 71 form a sample and hold circuit which operates as follows. When, at the time t3, a sampling pulse $\phi 1$ of high level is applied to the control signal terminal of the analog switch 66 and makes the analong switch 66 conductive, so that the output voltage of the amplifier 62 charges the capacitor 68 through the resistor 65 and the analog switch 66. Thus, the output voltage of the amplifier 62 is stored or held in the capacitor 68. When, then at the time 54, a sampling pulse 2 is applied to the control signal terminal of the analog switch 67, the analog switch 67 is made conductive, so that the output voltage of the amplifier 62 charges the capacitor 71 through the resistor 65 and the analog switch 67. Hence, the output voltage of the amplifier 62 at the time t4 is held or stored in the capacitor 71. Such sample and hold operations are alternatively and continuously carried out in response to the sampling pulse $\phi 1$ and $\phi 2$ from the counter. In this way, the output terminal of the amplifier 69 carries a voltage having the form shown by P3 in FIG. 4F and in accordance with the amount of incident light. The output terminal of the amplifier 72 carries a voltage having the form shown by P4 in FIG. 4G. The voltages produced at the output terminals of the amplifiers 69 and 72 are subtracted from each other in the operational amplifier 74, at whose output terminal a voltage having a form as shown by P5 in FIG. 4G is produced. Such a signal, out of which high frequency components (not shown in the drawing) such as noise and so on are eliminated, is transferred to the peak detecting circuit E.

Figure 4I:
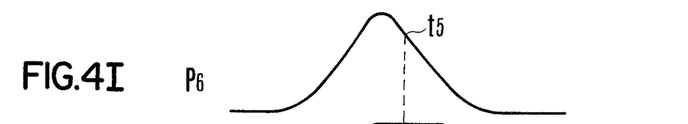
Figure 4J:
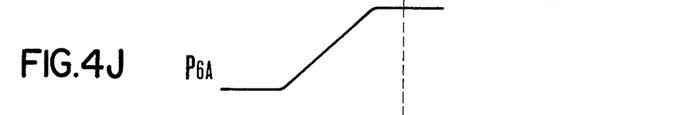
Figure 4K:
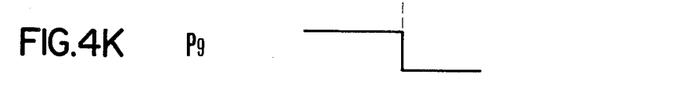

When a voltage having the form shown by P6 in FIG. 4I is applied to the input terminal of the peak detecting circuit E, the voltage is delivered to the inverting input terminal of the differential amplifier 88 through the amplifier 90 and the resistor 92 forming a buffer circuit. The output voltage of the low pass filter is also applied to the input terminal of the amplifier 80 the output voltage of the low pass filter, namely a voltage successively increasing voltage in accordance with the incident light amount is charged in the capacitor 82. When then along the movement of the LED 20 the light beam emitted from the LED 20 crosses the object OB and the amount of the light beam incident upon the light sensing element 23 starts to decrease, the input voltage to the amplifier 80 starts to decrease as is shown with P6 in FIG. 4. When then along with the decrease of the input voltage of the amplifier 80 the output voltage starts to increase gradually, the cathode side voltage of the diode 81 becomes higher than the anode side voltage so that the diode 81 interrupts the charging circuit of the capacitor 82. Thus, in the capacitor 82 the peak value of the output voltage from the low pass filter is held. This peak voltage is applied to the potentiometer 86 through the amplifier 84, divided there and then applied to the non-inversing input terminal of the differential amplifer 88. At this time, to the inversing input terminal of the differential amplifier 88 voltages as shown with P6 in FIG. 4 are applied, so that at the output terminal a voltage corresponding to their difference is produced. When then at the time point t5 (FIG. 4) the input voltage of the inversing input terminal of the differential amplifier 88 becomes lower than the voltage corresponding to the peak voltage charged in the capacitor 82, the output of the differential amplifier 88 assumes a positive potential. When the input voltage at the inversing input terminal of the differential amplifier 88 is further lowered, while the potential at the output terminal is further increased intil the potential becomes higher than the bias potential of the comparator 101, the output voltage of the comparator 101 is suddenly lowered down to the low level as is shown with P9 in FIG. 4, whereby the transistor 106 is brought into the non-conductive state so that the magnet is demagnetized. Consequently, the stop claw 5 shown in FIG. 1 is rotated along the clockwise direction by means of the strength of the spring 7 until the end of the claw 5 is engaged in the ratchet teeth 4 so as to stop the rotation of the lens barrel 2. At this time the photographing lens 1 has been withdrawn into the position corresponding to the object distance bn−1, so that the focus is properly adjusted. Hereby, the explanation about the exposure control of the camera is omitted here.

Hereby, in case the object OB is at the distance shorter than bn−2, for example at b2 in FIG. 5, the light beam emitted from the LED 20 and reflected upon the object OB is incident on the light sensing element 23 soon after the holder 21 starts to move in such a manner that the magnet 6 is demagnetized while the rotation of the lens barrel 2 stops immediately after the start of rotation so that the photographing lens 1 is focused at the distance b2.

Below, the case the object OB is at a distance at which the peak detecting circuit E does not operate properly, for example, at the distance bn−1 in FIG. 5 will be explained.

When the lens barrel 2 and the holder 21 is rotated into the position corresponding to the distance bn−1 even if the object OB is at such a position as mentioned above, an output signal having a peak as shown with P6 in FIG. 6 can be obtained at the output terminal of the low pass filters 77, 78 (hereinafter called LPF). However, when the object OB is at such a large distance, the amount of the light beam incident upon the light sensing element 23 is so small that the level of the output voltage of the LPF 77 and 78 is very low. Thus, the device operates as follows in this case.

Figure 6:
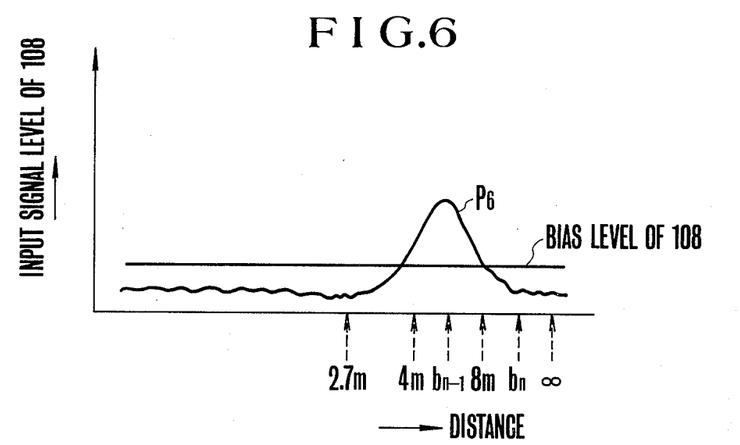
FIG. 6 shows the waveform of the input signal of the comparator 108 shown in FIG. 2.

Namely, when along with the movement of the holder operatively engaged with the lens barrel 2 the infrared beam emitted from the LED 20 is reflected upon the object OB in such a manner that a signal having a form as shown with P6 in FIG. 6 and a low level is produced at the output terminal of the LPF 77 and 78, the signal is applied to the inversing input terminal of the differential amplifier 88 through the buffer circuit as explained above.

On the other hand, the above signal is also applied to the non-inversing input terminal of the differential amplifier 88 through the peak detector 80, 81, 82, the potentiometer 86 and so on as explained above, so that at the output terminal of the differential amplifier 88 a signal having a level corresponding to the difference of the levels of the input signals is produced.

Thus, as explained above the peak value of the signal from the LPF is held in the capacitor, while the level at the non-inversing input terminal of the differential amplifier 88 becomes constant and then the level of the input signal at the inversing input terminal becomes lower than that at the non-inversing input terminal, whereby the level of the output signal of the differential amplifier 88 is inversed. When the holder 21 is further moved in operative engagement with the rotation of the lens barrel, the amount of the light beam incident upon the light sensing element 23 is further lowered, while the output voltage of the differential amplifier 88 is further raised, whereby the output voltage of the LPF is low, so that the output voltage of the differential amplifier 86 never surpasses the level of the bias voltage of the comparator 101 because the object OB is at a large distance. Thus, the output current of the comparator 101 remains at a high level, whereby although the photographing lens 1 has been withdrawn into the position corresponding to the object distance bn−1 by means of the rotation of the lens barrel 2 the transistor 106 is never inversed into the non-conductive state by means of the comparator.

However, when the lens barrel 2 is rotated into the position corresponding to the object distance bn−1, for example, 5 m, the pin 24 closes the normally open type switch 18 so that the diode 112 in FIG. 2 is earthed.

Because the bias level of the comparator 108 is set at a certain determined value as shwon in FIG. 6, when a signal as shown with P6 in FIG. 6 is produced at the output terminal of the LPF the output terminal of the comparator 108 and the anode of the diode 111 are at the low level at the time point at which the switch 18 is closed.

Consequently, as soon as the level of the anode of the diode 112 becomes low along with the closing of the switch 18 the level at the inversing input terminal of the comparator 115 becomes low. Thus the level at the output terminal of the comparator 115 becomes high, whereby the transistor 119 changes out of the non-conductive state into the conductive state, while the transistor 106 changes out of the conductive state into the non-conductive state so that the magnet 6 is demagnetized. Along with the demagnetization of the magnet 6 the rotation of the lens barrel 2 stops as explained above so as to properly adjust the focus at the distance bn−1.

Further, when the object OB is at a further larger distance, for example, at the hyper focal distance bn (FIG. 5), practically no beam reflected upon the object OB is incident upon the light sensing element 23, so that even when the lens barrel 2 and the holder 21 are moved into a positon corresponding to the distance bn−1 the output level of the LPF is nothing but the one of the noise. Consequently, the output level of the comparator 108 for detecting the output level of the LPF remains high. Consequently, even when at this time the switch 18 is closed the level at the inversing input terminal of the comparator 115 remains high, so that the level dt the output terminal remains low, whereby the stop claw 6 is attracted by means of the magnet 6, while the lens barrel 2 continues to be rotated by means of the rotation of the spring 111.

When then the lens barrel 2 is rotated into the position corresponding to the hyper focal distance bn, the pin 2b is in contact with the rising up part 29a of the charge lever 29, whereby the rotation of the lens barrel 2 is compulsorily interrupted so that the focus is adjusted at the hyper focal distance. Thus, at this time, not only the object at the distance bn but also all the object in the zone an (FIG. 5) are in proper focus.

As explained so far, in accordance with the present invention, in case the object is at a distance bn−1 at which the reflected light beam is too weak to be detected, the noise level is set by means of the comparator in such a manner that when a signal higher than the noise level exists the movement of the photographing lens is stopped at a certain determined distance bn−1, so that it is not necessary to prepare a large light projector, a large lens system or a large capacity power source, while the focus can be adjusted over a large range.

Further, in accordance with the present invention, in case the object is at such a large distance bn that the reflected light is too weak to detect the peak, the noise level is set at such a noise level by means of the comparator 108 that when the signal level is higher than the noise level the photographing lens is stopped at a certain distance bn−1, while when the signal level is lower than the noise level the photographing lens is moved into the hyper focal distance, so that it is not necessary to use a large light projector, a large lens system or large capacity power source, whereby the focus can be adjusted automatically over a large range, while further a large aperture lens with comparatively small focal depth can be used.

Further, in accordance with the present invention, the output of the light sensing circuit is sampled by means of the sampling signal $\phi 1$ and $\phi 2$ with small pulse width synchronized with the light emitting frequency of the LED 20 so as to detect only the signal component reflected on the object so that even if high level noises are present in the signals the undesired influence can be eliminated.

Further, in accordance with the present invention the higher harmonic components in the sampled signals are cut off by means of the LPF the misoperation by the noises due to the switching of semi-conductor switches can be avoided.

Further, in accordance with the present invention the movement of the lens is not stopped immediately even when the signal assumes the peak value, whereby the output of the comparator 101 is inversed only when the signal is decreased gradually for a certain determined period after the peak value is reached, so as to stop the movement of the lens, so that even if the peak due to the noises is detected by means of the peak detectors 80, 81, 82 in the course in which the signal is increased gradually a proper focus adjustment can be expected.

What is claimed is:

1. An automatic focus adjusting apparatus for a camera having a photographic lens, comprising:
    (a) a light projecting means for illuminating an object to be photographed;
    (b) a reflected light detecting means for producing an electrical signal corresponding to light reflected on an object to be photographed;
    (c) a peak detecting means for detecting a peak value of the electrical signal from the detecting means;
    (d) a first control means for producing a stop signal for stopping movement of the photographic lens in accordance with the output of the peak detecting means;
    (e) a stop means for stopping movement of the photographic lens in response to the output of the control means;
    (f) a comparison means connected to the light detecting means to compare the level of the electrical signal from the light detecting means with the level of a preset noise signal and produce a first control signal when the level of the electrical signal from the light detecting means is higher than that of the noise signal;
    (g) a predetermined distance detecting means operatively associated with the photographic lens to produce a second control signal when the photographic lens is moved to a given position corresponding to a distance at which the peak value of the electrical signal from the light detecting means cannot be detected by the peak detecting means; and
    (h) a second control means operatively connected to the stop means for stopping the movement of the photgraphic lens when the first and the second control signals are produced.

2. An apparatus in accordance with claim 1, wherein the light projecting means includes a light emitting element for emitting an infrared beam.

3. An apparatus in accordance with claim 2, wherein the light emitting element consists of a light emitting diode.

4. An apparatus in accordance with claim 2, wherein the light projecting means comprises:
    (a) a light emitting element, and
    (b) a means operatively connected to the photographic lens so as to enable light emission of the light emitting element in response to start of the movement of the photographic lens.

5. An apparatus in accordance with claim 1, wherein the light projecting means comprises:
    (a) a pulse generator; and
    (b) a light emitting element for intermittently emitting light in response to an output signal from the pulse generator.

6. An apparatus in accordance with claim 1, wherein the light projecting means comprises a light emitting element having a projection angle and a means in operative engagement with the photographic lens for changing the projection angle of the light emitting element in response to movement of the photographic lens.

7. An apparatus in accordance with claim 1, wherein the reflected light detecting means comprises:
    (a) a light sensitive element for producing an electrical signal corresponding to the light reflected from the object to be photographed having an output, and
    (b) a high-pass filter connected to the output of the light sensitive element.

8. An apparatus in accordance with claim 1, wherein the light projecting means comprises:
    (a) a pulse generator for producing a driving control pulse signal having a pulse width and a sampling control pulse signal with a pulse width smaller than the pulse width of the driving control pulse signal and synchronized with the control pulse signal; and
    (b) a light emitting means for intermittently emitting light in response to the driving control pulse signal.

9. An apparatus in accordance with claim 8, wherein the reflected light detecting means cmoprises:
    (a) a light sensitive element for producing an electrical signal corresponding to the light reflected from the object to be photographed; and
    (b) a means for sampling the electrical signal from the light sensitive element in accordance with the sampling control pulse signal.

10. An apparatus in accordance with claim 1, wherein the light projection apparatus comprises:
    (a) a pulse generator for producing a driving control pulse signal, a first sampling control pulse signal having a pulse width smaller than that of the driving control pulse signal and synchronized with the signal, and a second sampling control pulse signal having a pulse width smaller than that of the driving control pulse signal and synchronized with the driving control pulse signal but having a different phase than that of the first sampling control pulse signal; and (b) a light emitting means for intermittently emitting light in response to the driving control pulse signal.

11. An apparatus in accordance with claim 10, wherein the reflected light detecting means comprises:

(a) a light sensitive element for producing an electrical signal corresponding to the light reflected from the object to be photographed;

(b) a first sampling circuit for sampling the electrical signal from the light sensitive element in synchronism with the first sampling control pulse signal; and (c) a second sampling circuit for sampling the electrical signal from the light sensitive element in synchronism with the second sampling control pulse signal.

12. An apparatus in accordance with claim 11, wherein said first and second sampling circuits form respective outputs, and the reflected light detecting means further comprises:

(a) a first hold circuit connected to the output of the first sampling circuit for summing a first sampling output; and (b) a second hold circuit connected to the output of the second sampling circuit for summing a second sampling output.

13. An apparatus in accordance with claim 12, wherein the reflected light detecting means further comprises: a first circuit connected to the first hold circuit and the second hold circuit for subtracting the output of the second hold circuit from the output of the first hold circuit.

14. An apparatus in accordance with claim 13, wherein the reflected light detecting means further comprises: a low-pass filter connected to the output of the first circuit.

15. An apparatus in accordance with claim 1, wherein the peak detecting means comprises:

(a) a peak level holding circuit connected to the light detecting means so as to detect the peak of the signal from the reflected light detecting means and hold it;

(b) a differential amplifier having a first input terminal connected to the reflected light detecting means and a second input terminal connected to the peak level holding circuit; and (c) a comparator connected to the output of the differential amplifier so as to produce a signal when the output of the differential amplifier surpasses a predetermined value.

16. An apparatus in accordance with claim 1, wherein the predetermined distance detecting means comprises a switch.

17. An apparatus in accordance with claim 1, wherein the second control means comprises an AND gate connected to the comparison means and the output terminal of the predetermined distance detecting means.

18. An automatic focus adjusting apparatus for a camera having a photographic lens comprising:

(a) a light projecting means for scanning an object to be photographed;

(b) a reflected light detecting means for producing an electrical signal corresponding to the light reflected on the object to be photographed;

(c) a peak detecting means for detecting a peak value of the electrical signal from the detecting means;

(d) a first control means for producing a stop signal for stopping movement of the photographic lens in accordance with the output of the peak detecting means;

(e) a stop means for stopping movement of the photographic lens in response to the output of the control means;

(f) a comparison means connected to the light detecting means so as to produce a first control signal when the electrical signal level from the light detecting means is higher than a predetermined value;

(g) a predetermined distance detecting means for producing a second control signal when the scanning reaches a predetermined position corresponding to the distance at which the peak value of the signal from the light detecting means cannot be detected with the peak detecting means; and (h) a second control means operatively connected to the stop means for stopping the movement of the photographic lens when the first and the second control signals are produced.

19. An automatic focus adjusting apparatus for a camera having a photographic lens having a barrel and defining a hyperfocal distance, comprising:

(a) a light projecting means for scanning an object to be photographed;

(b) a reflected light detecting means for producing an electrical signal corresponding to the light reflected on the object to be photographed;

(c) a peak detecting means for detecting a peak value of the detection signal from the reflected light detecting means;

(d) a first control means for producing a stop signal for stopping movement of the photographic lens in accordance with the output of the peak detecting means;

(e) a stop means for stopping movement of the photographic lens in response to the output of the control means;

(f) a comparison means connected to the reflected light detecting means to produce a first control signal when the detecting signal level is lower than a predetermined value;

(g) a predetermined distance detecting means for producing a second control signal when the scanning reaches a predetermined position corresponding to the distance at which the peak value cannot be detected by the peak detecting means; and (h) a second control means for stopping movement of the photographic lens when both the first and the second control signals are produced.

20. An apparatus in accordance with claim 19, wherein the second control means comprises:

(a) a stopper; and (b) a member on the photographic lens barrel for engaging the stopper when the photographic lens is moved into a position corresponding to a hyperfocal distance.

21. An apparatus in accordance with claim 20, wherein the member consists of a pin.

22. An automatic focus adjusting apparatus for a camera having a taking lens, comprising:

(a) driving means for urging the taking lens from the position corresponding to the closest focusing distance to the camera toward the position corresponding to infinite focusing distance;

(b) light projecting means for illuminating an electrical signal corresponding to the light reflected by the object;

(c) light detecting means for producing an electrical signal corresponding to the light reflected by the object;

(d) peak detecting means for detecting the peak of the signal detected by the light detecting means;

(e) first control means for producing a stop signal to establish a point to stop movement of the taking lens in accordance with the output of the peak detecting means;

(f) stop means for stopping movement of the taking lens in response to the output of the first control means;

(g) comparison means connected to the output terminal of the light detecting means to produce a first control signal when the level of the electrical signal from the light detecting means is higher than a given value;

(h) predetermined distance detecting means for producing a second control signal when the taking lens reaches a given position corresponding to a distance shorter than the infinite distance at which the peak of the electrical signal from the light detecting means cannot be detected by the peak detecting means; and (i) second control means operatively connected to the stop means for stopping movement of the taking lens only when both the first and the second control signals are produced at the same time.

23. An automatic focus adjusting apparatus for a camera having a taking lens, comprising:

(a) light projecting means for illuminating an object to be photographed;

(b) light detecting means for producing an electrical signal corresponding to the light reflected by the object;

(c) level detecting means for detecting the level of the electrical signal from the light detecting means;

(d) comparison means for producing a first control signal when the level of the electrical signal from the light detecting means is higher than a given value;

(e) predetermined distance detecting means for producing a second control signal when the taking lens reaches a position corresponding to a distance at which the level of the electrical signal from the light detecting means cannot be deteced by the level detecting means, and (f) stop means for stopping movement of the taking lens only when both the first and the second control signals are produced at the same time.

24. An automatic focus adjusting apparatus for a camera having a taking lens, comprising:

(a) driving means for urging the taking lens from the position corresponding to the closest focusing distance (b) light projecting means for illuminating an object to be photographed;

(c) light detecting means for producing an electrical signal corresponding to the light reflected by the object;

(d) level detecting means for detecting the level of the electrical signal from the light detecting means;

(e) comparison means for producing a first control signal when the level of the electrical signal from the light detecting means is higher than a given value;

(f) predetermined distance detecting means for producing a second control signal when the taking lens reaches a given position corresponding to a distance at which the level of the electrical signal from the light detecting means cannot be detected by the level detecting means and corresponding to a hyperfocal distance; and (g) stop means for stopping movement of the taking lens only when both the first and the second control signals are produced at the same time.

25. An automatic focus adjusting apparatus for a camera having a photographic lens, comprising:

(a) first means for detecting a distance to an object to be measured and for generating an electric distance signal when the object is at a distance greater than a predetermined distance;

(b) second means for adjusting the lens to a hyperfocal distance in response to the electric distance signal;

(c) light projecting means for scanning the object;

(d) reflected light detecting means for producing an electrical signal corresponding to the light reflected by the object;

(e) comparison means connected to the reflected light detecting means to produce a first control signal when the detecting signal level is lower than a predetermined value;

(f) predetermined distance detecting means for producing a second control signal when the scanning reaches a predetermined position; and (g) third means for producing the electric distance signal when both the first and the second control signals are produced.

26. An automatic focus adjusting apparatus for a camera having a photographic lens, comprising:

(a) light projecting means for scanning an object to be measured;

(b) reflected light detecting means for producing an electrical signal corresponding to the light reflected by the object;

(c) comparison means connected to the reflected light detecting means to produce a first control signal when the detecting signal level is lower than a predetermined value;

(d) predetermined distance detecting means for producing a second control signal when the scanning reaches a predetermined position;

(e) first means for producing an electric distance signal when both the first and the second control signals are produced, and (f) second means for adjusting the lens to a hyperfocal distance in response to the electric distance signal.

27. An automatic focus adjusting apparatus according to claims 25 or 26, wherein the second means comprises:

(a) a stopper; and (b) a member on a photographic lens barrel responsive to the electric distance signal and for engaging the stopper when the photographic lens is moved into a position corresponding to the hyperfocal distance.

28. An apparatus for eliminating adverse effects of extraneous background light level variations, comprising:

(a) means for intermittently generating a light signal and projecting the light signal onto an object to be measured;

(b) first memory means for storing a quantity of electrical signals;
(c) second memory means for storing a quantity of electrical signal;
(d) reflected light detecting means responsive to the light signal reflected by the object for producing electrical signals corresponding to the light signal intermittently incident on the detecting means;
(e) first control gate means for connecting the first memory means with said image sensor during a given interval while the light signal incident on the image sensor is present;
(f) second control means for connecting the second memory means with said image sensor during a given interval while the light signal incident on the image sensor is absent; and
(g) first connect means connected to the first control gate means for effecting a connection operation of the first control gate means during a given interval while the light signal incident on the detecting means is present;
(h) second connect means connected to the second control gate means for effecting a connection operation of the second control gate means during a given interval while the light signal incident on the detecting means is absent; and
(i) means operatively connected to the first and second memory means for producing an electrical output signal related to the situation of the object and corresponding to the difference between electrical signals stored in said first and second memory means.

29. An automatic focus adjusting apparatus for a camera having a photographic lens, comprising:
(a) light measuring means having a light detecting element for producing an electrical signal corresponding to light incident on the light detecting element from an object to be measured;
(b) means for introducing information corresponding to a predetermined distance shorter than a hyperfocal distance of the photographic lens;
(c) signal producing means connected to the light measuring means and the introducing means for judging whether the object is at a distance greater than the predetermined distance on the basis of the outputs of the light measuring means and the introducing means and for producing a signal which represents that the object is at the distance greater than the predetermined distance; and
(d) means connected to the signal producing means for adjusting the photographic lens to a position corresponding to the hyperfocal distance when the signal producing means produces said signal.

30. An automatic focus adjusting apparatus for a camera having a photographic lens, comprising:
(a) light measuring means having a light detecting element and for producing an electrical signal corresponding to a light incident on the light detecting element from an object to be measured;
(b) means for introducing an information corresponding to a predetermined angle of a focus adjusting mechanism for said apparatus;
(c) signal producing means connected to the light measuring means and the introducing means for judging whether the object is at a distance greater than a predetermined distance on the basis of the outputs of the light measuring means and the introducing means and for producing a signal which represents that the object is at a distance greater than the predetermined distance; and
(d) means connected to the signal producing means for adjusting the photographic lens to a position corresponding to the hyperfocal distance when the signal producing means produces said signal.

31. An automatic focus adjusting apparatus for a camera having a photographic lens, comprising:
(a) means for projecting light onto an object to be measured;
(b) reflected light detecting means for producing an electrical signal corresponding to the light reflected by the object;
(c) means for introducing information corresponding to a predetermined angle of a focus adjusting mechanism for said apparatus;
(d) signal producing means being connected to the reflected light detecting means and the introducing means for judging whether the object is at a distance greater than a predetermined distance on the basis of the outputs of the reflected light detecting means and the introducing means and for producing a signal which represents that the object is at a distance greater than the predetermined distance; and
(e) means connected to the signal producing means for adjusting the photographic lens to a position corresponding to the hyperfocal distance when the signal producing means produces said signal.

* * * * *